(12) United States Patent
Komatsu

(10) Patent No.: US 8,992,675 B2
(45) Date of Patent: Mar. 31, 2015

(54) INK COMPOSITION, INK JET RECORDING APPARATUS, AND RECORDED ARTICLE

(71) Applicant: Seiko Epson Corporation, Tokyo (JP)

(72) Inventor: Hidehiko Komatsu, Chino (JP)

(73) Assignee: Seiko Epson Corporation (JP)

( * ) Notice: Subject to any disclaimer, the term of this patent is extended or adjusted under 35 U.S.C. 154(b) by 39 days.

(21) Appl. No.: 13/947,509

(22) Filed: Jul. 22, 2013

(65) Prior Publication Data

US 2014/0022321 A1 Jan. 23, 2014

(30) Foreign Application Priority Data

Jul. 23, 2012 (JP) .................. 2012-162381

(51) Int. Cl.
  *C09D 11/02* (2014.01)
  *C09D 11/30* (2014.01)
  *B41J 2/01* (2006.01)

(52) U.S. Cl.
  CPC .. *C09D 11/30* (2013.01); *B41J 2/01* (2013.01)
  USPC .................. 106/31.58; 106/31.86; 106/31.65

(58) Field of Classification Search
  USPC ................... 106/31.58, 31.86, 31.65
  See application file for complete search history.

(56) References Cited

U.S. PATENT DOCUMENTS

| | | | |
|---|---|---|---|
| 6,087,416 A | 7/2000 | Pearlstine et al. | |
| 6,723,784 B2 | 4/2004 | Ito et al. | |
| 7,219,989 B2 | 5/2007 | Uerz et al. | |
| 7,338,988 B2 | 3/2008 | Hesler et al. | |
| 8,173,227 B2 | 5/2012 | Morohoshi et al. | |
| 8,240,836 B2 | 8/2012 | Morohoshi et al. | |
| 2005/0176847 A1 | 8/2005 | Cagle | |
| 2005/0176848 A1* | 8/2005 | Chen et al. | 523/160 |
| 2007/0197685 A1 | 8/2007 | Aruga et al. | |
| 2009/0176071 A1* | 7/2009 | Koganehira et al. | 428/195.1 |
| 2010/0010121 A1 | 1/2010 | Koganehira et al. | |

FOREIGN PATENT DOCUMENTS

| | | |
|---|---|---|
| JP | 2000-044858 A | 2/2000 |
| JP | 3589408 | 7/2002 |
| JP | 3937170 | 6/2004 |
| JP | 2004-195451 A | 7/2004 |
| JP | 2005-220352 A | 8/2005 |
| JP | 2007-217671 A | 8/2007 |
| JP | 2008101192 A | 5/2008 |
| JP | 2008-133479 | 6/2008 |
| JP | 2009-067909 A | 4/2009 |
| JP | 2009-235155 A | 10/2009 |
| JP | 2010007054 A | 1/2010 |

OTHER PUBLICATIONS

English Machine Translation of JP 2010-007054.*
English Machine Translation of JP 2009-235155.*

* cited by examiner

*Primary Examiner* — Veronica F Faison
(74) *Attorney, Agent, or Firm* — Harness, Dickey & Pierce, P.L.C.

(57) ABSTRACT

An ink composition contains a coloring material, 1,2-pentanediol with a content in the range of more than 0% by mass to less than 20% by mass, and 1,2-hexanediol.

18 Claims, No Drawings

US 8,992,675 B2

INK COMPOSITION, INK JET RECORDING APPARATUS, AND RECORDED ARTICLE

Priority is claimed under 35 U.S.C. §119 to Japanese Application No. 2012-162381 filed on Jul. 23, 2012, which is hereby incorporated by reference in its entirety.

BACKGROUND

1. Technical Field

The present invention relates to an ink composition, an ink jet recording apparatus using the same, and a recorded article produced with the same.

2. Related Art

An inkjet recording apparatus including an ink jet recording head having nozzles from which very small ink droplets are discharged to record information with images and characters is used typically for recording on the surface of ink-absorbent recording media, such as paper. Typically, the ink composition used for the inkjet recording apparatus contains a coloring material such as dye or pigment, and the coloring material is dissolved or dispersed in a mixture of a high boiling point organic solvent and water. The high boiling point organic solvent, which is less volatile and can retain water, helps prevent the nozzles of the ink jet recording head from drying.

On the other hand, ink compositions are desired which allow inkjet recording apparatuses to record information on ink-non-absorbent or ink-low-absorbent recording media, such as book printing paper, synthetic paper, and plastic films, as well as on paper or other ink-absorbent recording media. For example, JP-A-2007-217671, JP-A-2008-101192, JP-A-2009-67909 and JP-A-2010-7054 propose ink compositions that can be used for recording on ink-non-absorbent or ink-low-absorbent recording media.

These ink compositions are, however, unlikely to dry quickly when being applied on an ink-non-absorbent or ink-low-absorbent recording medium because of the presence of a high boiling point organic solvent, such as glycerin. Consequently, the rub fastness of the images or characters of the recorded information tends to be reduced, and the images or characters are liable to be non-uniform in density in a portion formed with a large amount of ink, such as a solid portion.

On the other hand, ink compositions not containing a high boiling point organic solvent do not help prevent nozzles of the ink jet recording head from drying, and consequently, the nozzles are liable to be clogged. In addition, since an organic solvent less soluble in the main solvent is likely to separate from the ink composition, the storage stability of such an ink composition tends to be low.

SUMMARY

Accordingly, an advantage of some aspects of the invention is that it provides an ink composition and an ink jet recording apparatus that can be used for recording on various types of recording medium. More specifically, the invention provides an ink composition and an ink jet recording apparatus using the ink composition that can form images and characters exhibiting high rub fastness and little non-uniformity in density even on ink-non-absorbent and ink-low-absorbent recording media, and, in addition, that can prevent nozzles from being clogged and can be stably stored.

The aspects of the invention may provide following applications.

Application 1

According to an aspect of the invention, an ink composition is provided which contains a coloring material, 1,2-pentanediol with a content in the range of more than 0% by mass to less than 20% by mass, and 1,2-hexanediol.

Application 2

The ink composition may further contain at least one of a glycol ether having an HLB (Hydrophile-Lipophile Balance) value, measured by the Davies method, in the range of 3.0 to 7.8, an antifoaming agent and a hardly soluble alkanediol. The ratio of the total mass of the 1,2-pentanediol and the 1,2-hexanediol to the total mass of the glycol ether, the antifoaming agent and the hardly soluble alkanediol is in the range of 3:1 to 15:1.

Application 3

The ink composition may contain substantially no alkyl polyol having a normal boiling point of 280° C. or more.

Application 4

The ink composition may further contain an alkyl polyol having a normal boiling point in the range of 190 to 250° C. in addition to the 1,2-pentanediol and the 1,2-hexanediol.

Application 5

The ink composition may contain a glycol ether having an HLB value, measured by the Davies method, of 3.0 to 7.8.

Application 6

The ink composition may contain an antifoaming agent.

Application 7

The total content in the ink composition of alkyl polyols having a normal boiling point in the range of 190 to 250° C. may be in the range of 10% to 30% by mass.

Application 8

The coloring material may be a pigment dispersed with a resin dispersant.

The pigment has an average particle size in the range of 80 to 140 nm in a dispersed state.

Application 9

According to another aspect of the invention, a recording apparatus is provided which performs recording with the ink composition.

Application 10

According to still another aspect of the invention, a recorded article produced by recording with the ink composition is provided.

DESCRIPTION OF EXEMPLARY EMBODIMENTS

Preferred embodiments of the invention will now be described in detail. The following embodiments will be described by way of example. The invention is not limited to the disclosed embodiments, and various modifications may be made within the scope and spirit of the invention.

1. Ink Composition

1.1. Color Material

The ink composition of the present embodiment contains a coloring material. The coloring material may be a dye or a pigment, and is preferably a pigment because pigments have resistant to water, gases and light. Any known inorganic pigment, organic pigment or carbon black can be used as the pigment of the ink composition. The pigment content is preferably in the range of 0.5% to 20% by mass, more preferably 1% to 10% by mass, relative to the total mass of the ink composition.

For use of a pigment in the ink composition, it is desirable that the pigment be held in water in a stably dispersed state.

For this purpose, the pigment may be used in the form of dispersion in which the pigment is dispersed with a water-soluble and/or a water-dispersible resin dispersant (hereinafter referred to as resin-dispersed pigment dispersion), or in which the pigment is dispersed with a water-soluble and/or a water-dispersible surfactant (hereinafter referred to as surfactant-dispersed pigment dispersion). Alternatively, a hydrophilic functional group may be chemically or physically introduced to the surfaces of the pigment particles so that the pigment can be dispersed or dissolved in water without using a resin dispersant, a surfactant or any other dispersant. This type of pigment is hereinafter referred to as surface-treated pigment. Any of the resin-dispersed pigment dispersion, the surfactant-dispersed pigment dispersion and the surface-treated pigment can be used in the ink composition of the present embodiment. Although these pigment may be used in combination, it is preferable that at least a resin-dispersed pigment dispersion be used.

Examples of the resin dispersant used in the resin-dispersed pigment dispersion include polyvinyl alcohols, polyacrylic acid, acrylic acid-acrylonitrile copolymer, vinyl acetate-acrylic ester copolymer, acrylic acid-acrylic ester copolymer, styrene-acrylic acid copolymer, styrene-methacrylic acid copolymer, styrene-methacrylic acid-acrylic ester copolymer, styrene-α-methylstyrene-acrylic acid copolymer, styrene-α-methylstyrene-acrylic acid-acrylic ester copolymer, styrene-maleic acid copolymer, styrene-maleic anhydride copolymer, vinyl naphthalene-acrylic acid copolymer, vinyl naphthalene-maleic acid copolymer, vinyl acetate-maleic acid ester copolymer, vinyl acetate-crotonic acid copolymer, vinyl acetate-acrylic acid copolymer, and their salts. Among these, preferred are copolymers of a monomer having a hydrophobic functional group and a monomer having a hydrophilic functional group, and polymers formed of a monomer having both a hydrophobic functional group and a hydrophilic functional group. If a copolymer is used, the copolymer may be a random copolymer, a block copolymer, an alternating copolymer, or a graft copolymer.

Preferably, the resin dispersant has a molecular weight (weight average molecular weight) in the range of 1,000 to 100,000, more preferably in the range of 3,000 to 10,000. A resin dispersant having a molecular weight in these ranges allows the pigment to be stably dispersed in water, and facilitates the control of the viscosity of the ink composition. Preferably, the resin dispersant has an acid value in the range of 30 to 300, more preferably in the range of 50 to 150. A resin dispersant having an acid value in these ranges ensures that pigment particles are stably dispersed in water, and recorded articles produced by recording with the ink composition containing such a resin dispersant exhibit high water fastness.

The resin dispersant may be a commercially available product. Examples of the commercially available resin dispersant include JONCRYL 67 (weight average molecular weight: 12,500, acid value: 213), JONCRYL 678 (weight average molecular weight: 8,500, acid value: 215), JONCRYL 586 (weight average molecular weight: 4,600, acid value: 108), JONCRYL 611 (weight average molecular weight: 8,100, acid value: 53), JONCRYL 680 (weight average molecular weight: 4,900, acid value: 215), JONCRYL 682 (weight average molecular weight: 1,700, acid value: 238), JONCRYL 683 (weight average molecular weight: 8,000, acid value: 160), and JONCRYL 690 (weight average molecular weight: 16,500, acid value: 240), which are all products of BASF Japan.

Examples of the surfactant used in the surfactant-dispersed pigment dispersion include anionic surfactants, such as alkane sulfonates, α-olefin sulfonates, alkylbenzene sulfonates, alkylnaphthalene sulfonates, acylmethyltaurinates, dialkyl sulfosuccinates, alkylsulfates, sulfated olefins, polyoxyethylene alkyl ether sulfates, alkylphosphates, polyoxyethylene alkyl ether phosphates and monoglyceride phosphates; amphoteric surfactants, such as alkylpyridium salts, alkylamino salts and alkyldimethylbetaine; and nonionic surfactants, such as polyoxyethylene alkyl ethers, polyoxyethylene alkylphenyl ethers, polyoxyethylene alkyl esters, polyoxyethylene alkyl amides, glycerol alkyl esters and sorbitan alkyl esters.

Preferably, 1 to 100 parts by mass, more preferably 5 to 50 parts by mass, of a resin dispersant or surfactant is added to 100 parts by mass of the pigment. Such an amount of the resin dispersant or surfactant allows the pigment to be stably dispersed in water.

For preparing a pigment dispersion, a pigment, water and a resin dispersant (for a resin-dispersed pigment dispersion), a pigment, water and a surfactant (for a surfactant-dispersed pigment dispersion), or a surface-treated pigment and water (for a surface-treated pigment dispersion) are mixed and dispersed by a known disperser, such as ball mill, sand mill, attritor, roll mill, agitator mill, Henschel mixer, colloid mill, ultrasonic homogenizer, jet mill or angmill. If necessary, a water-soluble organic solvent, a neutralizer and other additives may further be added. For the resin-dispersed pigment dispersion, the pigment may be dispersed until its volume average particle size becomes in the range of 20 to 500 nm, preferably 50 to 300 nm, from the viewpoint of ensuring stability of the pigment dispersion. Also, from the viewpoint of color developability and rub fastness, the pigment is preferably dispersed until its volume average particle size becomes in the range of 80 to 140 nm. The resin of the resin dispersant may be soluble in water, or may be insoluble and present in the form of particles in water.

The term "average particle size" mentioned herein refers to volume average particle size, unless otherwise stated. The average particle size of the pigment can be measured with a particle size distribution analyzer based on a laser diffraction/scattering method. For example, a particle size distribution analyzer using dynamic light scattering (for example, Microtrac UPA manufactured by Nikkiso Co., Ltd.) may be used.

1.2. 1,2-Pentanediol

The ink composition of the present embodiment contains 1,2-pentanediol (normal boiling point: 210° C.) with a content in the range of more than 0% by mass to less than 20% by mass. Also, the ink composition does substantially not contain alkyl polyols having a normal boiling point of 280° C. or more. Such polyols, which are conventionally used as good moisturizing agents, are unsuitable for the ink composition required to be able to dry quickly. In the ink composition, 1,2-pentanediol helps images printed on an ink-non-absorbent or ink-low-absorbent recording medium dry quickly, functions to prevent the ink jet recording head from being clogged and to help other organic components and the surfactant dissolve in the ink vehicle, and enhances the wettability of the ink composition to ink-non-absorbent or ink-low-absorbent recording media, while allowing the ink composition to be stably stored. Furthermore, 1,2-pentanediol helps absorbent recording media, such as paper, absorb the ink composition and enhances the color developability of images printed on absorbent recording media. Consequently, the use of 1,2-pentanediol reduces non-uniformity in density on various types of recording media, and thus allows the recording of information including images or characters exhibiting high color developability without bleeding. In addition, clogging of the nozzles of the ink jet recording head can be reduced. Furthermore, 1,2-pentanediol allows hardly soluble organic components to dissolve in the ink vehicle, as with 1,2-hexanediol described later, and does not inhibit the stable dispersion of the coloring material and resin as much as 1,2-hexanediol.

However, the presence of a large amount of 1,2-pentanediol in the ink composition inhibits the sable dispersion of the pigment and consequently degrades the storage stability of the ink composition, and such an ink composition does not dry easily on the recording medium. Accordingly, the 1,2-pentanediol content in the ink composition is desirably less than 20% by mass.

The 1,2-pentanediol content is preferably in the range of 0.5% to 10% by mass relative to the total mass of the ink composition, from the viewpoint of enhancing the wettability and penetration of the ink composition to the recording medium to reduce the non-uniformity in density, and ensuring the storage stability and reliable ejection of the ink composition. It has been found, in some cases, that 1,2-pentanediol with a content of less than 0.5% by mass did not sufficiently produce the effect of allowing other organic components and the surfactant to dissolve in the ink vehicle and, thus degrading the storage stability of the ink composition, or did not sufficiently allow the ink composition to be stably discharged from the ink jet recording head. An ink composition that can dry easily may be liable to clog the nozzles of an ink jet recording head. If the 1,2-pentanediol content is more than 20% by mass, the pigment is not stably dispersed, and ink composition does not dry easily. Consequently, images formed with the ink composition have non-uniform density and may not be reliably fixed. Also, it may be difficult to adjust the ink composition to a viscosity suitable for ink jet recording.

The phrase "substantially not contain alkyl polyols" or "contain(s) substantially no alkyl polyol" mentioned herein suggests that the alkyl polyol may be contained to the extent that it does not function effectively. In a quantitative sense, the content of an alkyl polyol having a normal boiling point of 280° C. or more may be less than 1.0% by mass, and is preferably less than 0.5% by mass, more preferably less than 0.1% by mass, and still more preferably 0.05% by mass, relative to the total mass (100% by mass) of the ink composition.

1.3. 1,2-Hexanediol

The ink composition contains 1,2-hexanediol (normal boiling point: 224° C.) from the viewpoint of enhancing the wettability and penetration of the ink composition to recording media so as to reduce non-uniformity in density, and of ensuring stable storage and stable ejection of the ink composition. The 1,2-hexanediol content in the ink composition is preferably in the range of 0.5% to 10% by mass. More preferably, it is in the range of 1% to 7% by mass. If the 1,2-hexanediol content is less than 0.5% by mass, the ink composition cannot be stably stored. Also, the nozzles of the ink jet recording head are likely to be clogged because the ink composition dries more easily. In contrast, if the 1,2-hexanediol content is more than 10% by mass, the ink composition will dry easily. Consequently, the image of the resulting recorded article is likely to have non-uniform density, and may not be reliably fixed. Also, it may be difficult to adjust the ink composition to a viscosity suitable for ink jet recording.

The combined use of 1,2-hexanediol and 1,2-pentanediol can produce significant effects of enhancing the moisture-retaining property and ejection stability of the ink composition and of allowing hardly soluble components to dissolve in the ink vehicle (enhancing the storage stability of the ink composition).

In addition, 1,2-hexanediol has higher effect of allowing hardly soluble components to dissolve in the ink vehicle (enhancing the storage stability of the ink composition) than 1,2-pentanediol. By using the two diols in combination, the characteristics of the ink composition are balanced, such as storage stability and ejection stability. The total content of 1,2-hexanediol and 1,2-pentanediol is preferably in the range of 1% to 20% by mass, and more preferably in the range of 2% to 20% by mass.

1.4. Alkyl Polyols

Preferably, the ink composition of the present embodiment further contains an alkyl polyol having a normal boiling point in the range of 190 to 250° C. in addition to 1,2-pentanediol and 1,2-hexanediol. By adding an alkyl polyol having such a boiling point, the wettability, penetration and ease of drying, of the ink composition can be controlled independent of what type of recording medium is used. Consequently, the ink composition can form images satisfactorily fixed to various types of recording media, and clogging of the nozzles of the ink jet recording head can be reduced.

The total content of alkyl polyols having a normal boiling point in the range of 190 to 250° C. in the ink composition is preferably in the range of 10% to 30% by mass from the viewpoint of the ease of drying on recording media and the storage stability in the recording head.

Alkyl polyols having a normal boiling point of 190 to 250° C. other than 1,2-pentanediol and 1,2-hexanediol include 1,2-butanediol (boiling point: 194° C.), ethylene glycol (boiling point: 196° C.), 1,2-ethanediol (boiling point: 197° C.), 1,2-propanediol (boiling point: 188° C.), 2-methylpentane-2,4-diol (boiling point: 197° C.), dibutylene glycol (boiling point: 202° C.), 1,3-butylene glycol (boiling point: 207° C.), 1,3-butanediol (boiling point: 208° C.), 1,3-propanediol (boiling point: 210° C.), 3-methyl-1,3-butanediol (boiling point: 203° C.), 2-methyl-1,3-propanediol (boiling point: 214° C.), 2,2-dimethyl-1,3-propanediol (boiling point: 210° C.), 2-ethyl-2-methyl-1,3-propanediol (boiling point: 226° C.), 1,2-heptanediol (boiling point: 227° C.), 1,4-butanediol (boiling point: 230° C.), 2-methyl-2-propyl-1,3-propanediol (boiling point: 230° C.), dipropylene glycol (boiling point: 230° C.), 2-ethyl-1,3-hexanediol (boiling point: 244° C.), 3-methyl-1,5-pentanediol (boiling point: 249° C.), and 1,6-hexanediol (boiling point: 250° C.). Among these, preferred are 1,2-butanediol (boiling point: 194° C.), 1,3-butanediol (boiling point: 208° C.), 3-methyl-1,5-pentanediol (boiling point: 249° C.), and 3-methyl-1,3-butanediol (boiling point: 203° C.). Propylene glycol (boiling point: 188° C.) does not satisfy the requirement to the boiling point of the alkyl polyol.

1.5. Glycol Ether

Preferably, the ink composition of the present embodiment further contain a glycol ether having an HLB (Hydrophile-Lipophile Balanc) value, measured by the Davies method, in the range of 3.0 to 7.8. By adding a glycol ether having an HLB value in this range, the wettability and penetration of the ink composition can be controlled independent of what type of recording medium is used. Consequently, clear images substantially uniform density can be formed on various types of recording medium, particularly on ink-non-absorbent or ink-low-absorbent recording media.

The HLB value of glycol ether used herein refers to a value representing the degree of hydrophilicity of a compound, proposed by Davies et. at, and it can be obtained by, for example, the Davies method defined in J. T. Davies and E. K. Rideal, Interface Phenomena, 2nd ed., Academic Press, New York, 1963, and is calculated from the following equation (1):

$$\text{HLB value} = 7 + \Sigma[1] + \Sigma[2] \quad (1)$$

where [1] represents the number of hydrophilic groups, and [2] represents the number of hydrophobic groups. Table 1 shows the numbers of typical hydrophilic groups and hydrophobic groups.

TABLE 1

| Structure | Number of groups |
|---|---|
| —CH$_2$— | −0.475 |
| —CH$_3$ | −0.475 |
| —(CH$_2$CH$_2$O)— | +0.330 |
| —(CHCH$_2$O)—<br>    |<br>   CH$_3$ | −0.150 |
| —OH | +1.900 |

The glycol ether in the ink composition preferably has an HLB value, measured by Davies method, in the range of 3.0 to 7.8. When the HLB value of the glycol ether is less than 3.0, the hydrophobicity of the glycol ether is increased. Hence, the affinity of the glycol ether to water, which is the main solvent of the ink composition, is reduced, and accordingly, the storage stability of the ink composition may be reduced. When the HLB value is larger than 7.8, the wettability and penetration of the ink composition to recording media are reduced. Consequently, the non-uniformity in density of the image may become conspicuous. In particular, the wettability of the ink composition to ink-non-absorbent or ink-low-absorbent recording media, which have hydrophobic surfaces, tends to be significantly reduced. The HLB value is preferably in the range of 4.2 to 7.1.

Examples of the glycol ether used in the ink composition include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. These glycol ethers may be used singly or in combination.

Preferably, the alkyl group of the glycol ether has a branched structure. An ink composition containing a glycol ether whose alkyl group has a branched structure can form clear images having substantially uniform density on ink-non-absorbent or ink-low-absorbent recording media. Examples of such a glycol ether include ethylene glycol monoisobutyl ether, ethylene glycol monoisohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, and diethylene glycol mono-2-methylpentyl ether.

The alkyl group having a branched structure of the glycol ether is preferably 2-methylpentyl, 2-ethylpentyl or 2-ethylhexyl from the viewpoint of enhancing the color developability, and the 2-ethylhexyl group is particularly preferred. More specifically, examples of the glycol ether having such an alkyl group include ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, and diethylene glycol mono-2-methylpentyl ether. Among these, preferred are ethylene glycol mono-2-ethylhexyl ether, diethylene glycol mono-2-ethylhexyl ether, and triethylene glycol mono-2-ethylhexyl ether.

The glycol ether content is preferably in the range of 0.05% to 6% by mass relative to the total mass of the ink composition, from the viewpoint of enhancing the wettability and penetration of the ink composition to the recording medium to reduce the non-uniformity in density, or ensuring stable storage and reliable ejection of the ink composition. If the glycol ether content is less than 0.05% by mass, the wettability and penetration of the ink composition are reduced and the ink composition cannot dry easily. Consequently, it becomes difficult to form clear images, and the density (color developability) of the images may not be satisfactory. If the glycol ether content is higher than 6% by mass, the viscosity of the ink composition is increased. This causes clogging of the head, and such an amount of glycol ether does not dissolve completely in the ink composition. Accordingly, the ink composition may not be stably stored. The glycol ether having an HLB value, measured by Davies method, in the range of 3.0 to 7.8 is allowed to dissolve in the ink vehicle by the presence of the above-described alkyl polyols in the ink composition.

1.6. Resin Particles

The ink composition may contain resin particles including polymer particles that can form a resin coating with a drying unit of the ink jet recording apparatus to help the ink composition fix to the recording medium and wax particles that can impart gloss and smoothness to the surface of the resulting recorded article to enhance the rub fastness of the recorded article. The resin particles in the ink composition may be a combination of polymer particles and wax particles. The heat deflection temperature of the resin particles may be more than 40° C. The polymer particles and the wax particles will be described in detail below.

1.6.1. Polymer Particles

The polymer particles may be made of a resin selected from the group consisting of acrylic resins, methacrylic resins, styrene resins, urethane resins, acrylamide resins and epoxy resins, or a mixture of these resins. These resins may each be in the form of homopolymer or copolymer, and may have a single phase structure or a double phase structure (core shell type). Examples of such a resin include polyacrylic esters and their copolymers; polymethacrylic esters and their copolymers; polyacrylonitrile and its copolymers; polycyanoacrylate, polyacrylamide, polyacrylic acid, polymethacrylic acid, polyethylene, polypropylene, polybutene, polyisobutylene, polystyrene and their copolymers; petroleum resin; chromane-indene resin; terpene resin; polyvinyl acetate and its copolymers; polyvinyl alcohol; polyvinyl acetal; polyvinyl ether; polyvinyl chloride and its copolymers; polyvinylidene chloride; fluorocarbon polymer; fluorocarbon rubber; polyvinyl carbazole; polyvinylpyridine; polyvinyl imidazole; polybutadiene and its copolymers; polychloroprene; polyisoprene; and natural resins. Preferably, the resin particles have a structure having both a hydrophobic portion and a hydrophilic portion.

The polymer particles may be prepared from a known material by a known method, as disclosed in JP-B-62-1426, JP-A-3-56573, JP-A-3-79678, JP-A-3-160068, or JP-A-4-18462. Commercially available polymer particles may be used, such as Micro Gel E-1002 and Micro Gel E-5002 (each product of Nippon Paint), VONCOAT 4001 and VONCOAT 5454 (each product of DIC), SAE 1014 (product of Nippon Zeon), Saivinol SK-200 (product of Saiden Chemical Industry), and JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780 and JONCRYL 7610 (each product of BASF), TAKELAC WS-5000, TAKELAC WS-6021, TAKELAC W-6010, TAKELAC W-6020, TAKELAC W-6061, TAKELAC W-605, TAKELAC W-635, TAKELAC W-5030 and TAKELAC W-5661 (each product of Mitsui Chemicals, Inc.), and RESAMINE D-1060, RESAMINE D-4051, RESAMINE D-4052, RESAMINE D-4080, RESAMINE D-4200, RESAMINE D-6300 and RESAMINE D-6455 (each product of Dainichiseika Color & Chemicals Mfg.)

The polymer particles may be prepared by any one of the following methods. These methods may be combined if necessary. A monomer of a desired polymer particle component is mixed with a polymerization catalyst (polymerization initiator) and a dispersant to be polymerized (emulsion polymerization). A polymer having a hydrophilic portion may be dissolved in a water-soluble organic solvent, and after mixing the solution with water, the water-soluble organic solvent is removed by evaporation. A polymer may be dissolved in a water-insoluble organic solvent, and the solution and a dispersant are mixed in water. These methods can be appropriately selected according to the type and the properties of the polymer particles to be used. Examples of the dispersant used for dispersing a polymer include, but not limited to, anionic surfactants, such as sodium dodecylbenzenesulfonate, sodium lauryl phosphate and polyoxyethylene alkyl ether ammonium sulfate; and nonionic surfactants, such as polyoxyethylene alkyl ether, polyoxyethylene alkyl ester, polyoxyethylene sorbitan fatty acid ester and polyoxyethylene alkylphenyl ether. These dispersants may be used singly or in combination.

The polymer particles preferably contain at least one component having a heat deflection temperature (either glass transition temperature or minimum film forming temperature (MFT)) of 40° C. or more. The component having a heat deflection temperature of 40° C. or more allows the polymer particles to form a strong resin coating effectively in a second operation (drying operation) described later. Consequently, the rub fastness of the image of the recorded article is further enhanced. In addition, the nozzle tips of ink jet recording heads are not easily clogged. In contrast, polymer particles containing a component having a heat deflection temperature of less than 40° C. do not easily form a strong resin coating even by the drying operation, and consequently, the image of the recorded article may exhibit unsatisfactory rub fastness. Furthermore, the ink composition is likely to solidify at the nozzle tips, thus clogging the nozzles. Preferably, the polymer particles have a volume average particle size of 5 to 2,000 nm, more preferably 50 to 800 nm, from the view point of ensuring stable storage and stable ejection of the ink composition.

1.6.2. Wax Particles

The ink composition of the present embodiment may further contain wax particles. The wax particles, which may be used in combination with the polymer particles that will form a resin coating in the drying operation to help the ink composition fix to the recording medium, produce the synergistic effect of imparting gloss and smoothness to the surface of the resulting recorded article to enhance the rub fastness of the recorded article. Preferably, polymer particles and wax particles are used in combination. The wax particles will be described in detail below.

The wax particles may be made of a vegetable or animal wax, such as carnauba wax, candelilla wax, beeswax, rice wax, or lanolin; a petrolatum wax, such as paraffin wax, microcrystalline wax, polyethylene wax, oxidized polyethylene wax, or petroleum; mineral wax, such as montan wax or ozokerite; a synthetic wax, such as carbon wax, Hoechst wax, polyolefin wax, or stearic acid amide; or natural or synthetic wax emulsion or blended wax such as α-olefin-maleic anhydride copolymer. These waxes may be used singly or in combination. Among these, polyolefin wax and paraffin wax are preferred, and polyethylene wax and polypropylene wax are particularly preferred. Commercially available wax particles may be used, such as NOPCOTE PEM 17 (product of San Nopco), CHEMIPEARL W4005 (product of Mitsui Chemicals), and AQUACER 515 and AQUACER 593 (each product of BYK).

Preferably, the wax particles have a volume average particle size of 5 to 400 nm, more preferably 20 to 100 nm, from the view point of ensuring stable storage and stable ejection of the ink composition. More preferably, the wax particles have a heat deflection temperature of 40° C. or more as with the polymer particles.

The wax particle content in a solid basis is preferably in the range of 0.1% to 5% by mass relative to the total mass of the ink composition. Such a content of the wax particles allows the ink composition to be solidified and fixed even to ink-non-absorbent and ink-low-absorbent recording media. Combined use of the wax particles and the polymer particles results in a superior effect.

Although it is not clear why combined use of the polymer particles and the wax particles allows the formation of images having satisfactory rub fastness, the reason may be as below. The component of the polymer particles is compatible with ink-non-absorbent or ink-low-absorbent recording media and water-insoluble coloring materials. Accordingly, when the polymer particles form a resin coating in the drying operation (second operation), the resin coating covers the particles of the coloring material and thus tightly fixes the coloring material to the recording medium. Also, the component of the wax particles present on the surface of the resin coating reduces the frictional resistance of the surface of resin membrane. Consequently, the resulting resin coating is difficult to scratch or remove from the recording medium even by external rubbing. Probably, this is the reason why the image of the recorded article exhibits high rub fastness.

If polymer particles and wax particles are used in combination, the mass ratio of the polymer particles to the wax particles is preferably in the range of 1:1 to 5:1 in a solid basis. In the ratio in this range, the resin particles function effectively as described above, so that the image of the recorded article exhibits satisfactory rub fastness.

1.7. Surfactant

The ink composition of the present embodiment may further contain a surfactant. The surfactant allows the ink composition to spread uniformly over the surface of the recording medium. Thus, clear images can be formed substantially without non-uniform density.

The surfactant having such an effect may be nonionic. Preferably, a silicone surfactant or an acetylene glycol-based surfactant is used as such a nonionic surfactant. These surfactants are compatible with the glycol ether and alkyl polyol in the ink composition and can produce a synergistic effect with the glycol ether and alkyl polyol.

For example, polysiloxane compounds such as polyether-modified organosiloxane are preferred silicone surfactants. More specifically, silicone surfactants include BYK-306, BYK-307, BYK-333, BYK-341, BYK-345, BYK-346, and BYK-348 (each, product of BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (each, product of Shin-Etsu Chemical Co., Ltd.). The silicone surfactant content in the ink composition is preferably 1.0% by mass or less.

Acetylene glycol-based surfactants are superior to the other surfactants in appropriately controlling surface tension and interface tension. Consequently, the ink composition containing an acetylene glycol-based surfactant can appropriately control the surface tension and the interface tension between the ink composition and the printer member coming into contact with the ink composition, such as the ends of nozzles of the head. Thus, the ink composition can be stably ejected by an ink jet recording method. In addition, acetylene glycol-based surfactants act as favorable wetting agents or penetrating agents on recording media. Accordingly, the ink composition containing an acetylene glycol-based surfactant can form high-definition images substantially without non-uniform density. The acetylene glycol-based surfactant content in the ink composition is preferably 1.0% by mass or less.

Examples of the acetylene glycol-based surfactant include Surfynols 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, and GA (each, product of Air Products and Chemicals Inc.); Olfines B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (each, product of Nissin Chemical Industry); and Acetylenols E00, E00P, E40, and E100 (each, product of Kawaken Fine Chemicals).

1.8. Antifoaming Agent

The ink composition may contain an antifoaming agent. The antifoaming agent allows the ink composition to be stably ejected.

Examples of the antifoaming agent include, but are not limited to, silicone antifoaming agents, polyether antifoaming agents, fatty acid ester antifoaming agents, and acetylene glycol antifoaming agents. Among these, silicone antifoaming agents and acetylene glycol antifoaming agents are preferred. These are superior in keeping the surface tension and interface tension properly, and can prevent foaming. The antifoaming agent preferably has an HLB value, measured by the Griffin method, of 6 or less, more preferably 5 or less. Solvents having low HLB values can be used as antifoaming agents, but are hardly soluble. However, 1,2-pentanediol contained in the ink composition helps such a hardly soluble antifoaming agent dissolve.

Commercially available antifoaming agents may be used without particular limitation, such as BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, and BYK-1770 (each, product of BYK); and Surfynols DF37, DF110D, DF58, DF75, DF220 and MD-20 and Enviro Gem AD01 (each, product of Air Products and Chemicals).

Antifoaming agents may be used singly or in combination.

The antifoaming agent content is preferably in the range of 0.01% to 1% by mass relative to the total mass (100% by mass) of the ink composition.

1.9. Pyrrolidone Derivative

The ink composition may further contain a pyrrolidone derivative. The ink composition containing a pyrrolidone derivative can wet the recording medium uniformly over the surface of the recording medium when droplets thereof are deposited on an ink non-absorbent recording medium made of a plastic film, such as polyvinyl chloride, polyethylene terephthalate, polyethylene, or polypropylene. Consequently, even a solid image does not have non-uniform density or bleeding much, and thus high-definition clear images can be formed. Although the reason is not clear, it can be thought that the use of a pyrrolidone derivative increases the wettability of the ink composition to plastic films since the pyrrolidone structure of the pyrrolidone derivative molecule has a high affinity to recording media made of plastic films. Also, since pyrrolidone derivatives are compatible with glycol ethers and alkyl polyols, the ink composition exhibits satisfactory storage stability and ejection stability. In addition, the pyrrolidone derivative in the ink composition will act as a coating component after drying, thus enhancing the rub fastness of the image of the recorded article.

Examples of the pyrrolidone derivative include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone.

The pyrrolidone derivative is added in an amount in which the ink composition can exhibit intended properties. Preferably, 0.1% to 10% by mass, more preferably 1% to 5% by mass, of a pyrrolidone derivative is added relative to the total mass of the ink composition. With a content in these ranges, the pyrrolidone derivative can impart the above-described properties to the ink composition, and the ink composition can have a viscosity suitable for ink jet recording.

1.10. Other Additives

In order to enhance the performance of the ink composition, the ink composition may further contain other components as needed, such as a penetrating solvent, a moisturizing agent, a preservative or fungicide, a pH adjuster, and a chelating agent.

Also, the ink composition may contain a hardly soluble alkanediol in view of penetration, moisture-retaining property, and media adaptability. The hardly soluble alkanediol refers to an alkanediol having a carbon number of 8 or more. Such alkanediols include 1,2-octanediol, 2-ethyl-1,3-hexanediol, and 4,4-dimethyl-1,2-pentanediol.

1.11. Water

The ink composition preferably contains water. Water can be the main solvent in the ink composition, and will be diffused and evaporated in the drying operation described later. Preferably, the water is pure water or ultra-pure water from which ionic impurities have been removed as much as possible. Examples of such water include ion exchanged water, ultrafiltered water, reverse osmosis water, and distilled water. Preferably, sterile water prepared by, for example, UV irradiation or addition of hydrogen peroxide is used. The use of sterile water can prevent, for a long time, the occurrence of mold or bacteria in the pigment dispersion and the ink composition containing the pigment dispersion.

1.12. Properties of Ink Composition

The ink composition is preferably neutral or alkaline, and more preferably has a pH in the range of 7.0 to 10.0. An acid ink composition may be inferior in storage stability and dispersion stability. In addition, an acid ink composition is likely to corrode metal portions of the ink flow channel in the ink jet recording apparatus. The pH of the ink composition can be adjusted to be neutral or alkaline with a pH adjuster.

Preferably, the ink composition has a viscosity in the range of 1.5 to 15 mPa·s at 20° C. The ink composition having a viscosity in this range can be stably ejected in a first operation described later. The surface tension of the ink composition is preferably 15 to 40 mN/m, more preferably 20 to 35 mN/m, at 25° C. The ink composition having a surface tension in these ranges can be stably ejected in the below-described first operation, and can exhibit appropriate wettability to ink-non-absorbent or ink-low-absorbent recording media.

1.13. Others

If the ink composition containing at least one of a glycol ether having a low solubility in water and an HLB value, measured by the Davies method, in the range of 3.0 to 7.8, an antifoaming agent and a hardly soluble alkanediol, the ratio of the total mass of the 1,2-pentanediol and the 1,2-hexanediol to the total mass of the glycol ether, the antifoaming agent and the hardly soluble alkanediol is preferably in the range of 3:1 to 15:1 from the viewpoint of storage stability. This ratio is more preferably in the range of 5:1 to 12:1.

1.14. Method for Producing Ink Composition

The ink composition of the present embodiment can be prepared by mixing the above-described materials in an arbitrary order and optionally removing impurities by, for example, filtration. Preferably, the coloring material is previously dispersed in an aqueous medium from the viewpoint of easy handling. It may be suitable for mixing that the materials are added one after another into a container equipped with a stirrer, such as a mechanical stirrer or a magnetic stirrer, and mixed together. Filtration may be performed as required by, for example, centrifugal filtration or using a filter paper.

2. Ink Jet Recording Apparatus

An ink jet recording apparatus according to an embodiment of the invention includes an ink jet recording head and a drying mechanism, and performs a first operation in which the ink jet head ejects droplets of the above-described ink composition onto a recording medium to form an image, and a second operation in which the drying mechanism dries the ink composition on the recording medium. These operations will now be described in detail.

2.1. First Operation

In the first operation, the ink jet recording head ejects droplets of the ink composition onto a recording medium to form an image. Any technique may be used to eject the ink composition as long as droplets of the ink composition are deposited on the recording medium through a fine nozzle. For example, the following four techniques may be used.

A first technique is electrostatic suction. In this technique, a strong electric field is applied between the nozzle and an acceleration electrode disposed in front of the nozzle. Droplets of an ink are continuously ejected from the nozzle, and a printing information signal is applied to deflecting electrodes while the ink droplets fly between the deflecting electrodes, so that recording is performed. Ink droplets may be ejected according to printing information signals without deflecting the ink droplets.

A second technique is a method for forcibly ejecting ink droplets by applying a pressure to the ink with a small pump, and mechanically vibrating the nozzle with a quartz resonator. The ejected ink droplets are charged simultaneously with the ejection of the ink, and recording is performed by applying printing information signals to deflecting electrodes while the ink droplets fly between the deflecting electrodes.

A third technique uses a piezoelectric element. A pressure and printing information signals are simultaneously applied to the ink with the piezoelectric element so as to eject ink droplets for recording information.

In a fourth technique, the volume of the ink may be rapidly expanded by thermal energy. The ink is bubbled by heating with a small electrode according to printing information signals, and is thus ejected for recording.

The recording medium may be selected as desired. In particular, the ink jet recording apparatus of the present embodiment is suitable for ink-non-absorbent or ink-low-absorbent media. The ink-non-absorbent and ink-low-absorbent recording media used herein refer to recording media that can absorb water in an amount of 10 mL/m$^2$ or less for a period of 30 ms$^{1/2}$ from the beginning of contact with water when the water absorption is measured by the Bristow method. The Bristow method is broadly used as a method for measuring liquid absorption for a short time, and Japan Technical Association of the Pulp and Paper Industry (JAPAN TAPPI) has officially adopted this method. Details of this method are specified in Standard No. 51 (Paper and Paperboard-Liquid absorption Test Method-Bristow's Method (in Japanese)) of JAPAN TAPPI Paper and Pulp Test Methods edited in 2000 (in Japanese).

The ink-non-absorbent recording medium may be a plastic film not surface-treated for ink jet printing (not having an ink-absorbing layer), or a paper sheet or any other medium coated or bonded with a plastic film. The plastic here may be polyvinyl chloride, polyethylene terephthalate, polycarbonate, polystyrene, polyurethane, polyethylene, or polypropylene. The ink-low-absorbent recording medium may be art paper, coated paper, or matte paper.

2.2. Second Operation

In the second operation of the ink jet recording apparatus, the heating mechanism dries the ink composition on the recording medium at least either during or after the first operation. By the second operation, the liquid medium (more specifically, water, glycol ether and alkyl polyols) contained in the ink composition deposited on the recording medium is rapidly evaporated, so that the resin component in the ink composition such as an optionally added pyrrolidone derivative and/or polymer particles forms a coating. Consequently, high-quality images with substantially uniform density can be formed in a short time on an ink-non-absorbent recording medium, such as a plastic film not having an ink absorbing layer. The coating of the pyrrolidone derivative and/or polymer particles allows the dry matter of the ink composition to adhere to the recording medium, thus fixing the image.

Any drying mechanism may be used for the second operation without particular limitation, as long as it can accelerate the evaporation of the liquid medium of the ink. For example, the recording medium may be heated at least either during or after the first operation, or the ink composition on the recording medium may be blown after the first operation. These techniques may be combined. More specifically, the drying mechanism may be a forcible air heater, a radiation heater, an electrically conductive heater, a high-frequency dryer or a microwave dryer.

If heat is applied for the second operation, the heating temperature is not particularly limited as long as it is such that the evaporation and diffusion of the liquid medium of the ink composition can be accelerated. For example, the heating temperature is 40° C. or more, preferably in the range of 40 to 80° C., and more preferably in the range of 40 to 60° C. If the heating temperature is higher than 80° C., the recording medium may be undesirably deformed depending on the type of the recording medium, thereby being hindered from being transported after the second operation. Also, the recording medium may be undesirably shrunk when it is cooled to room temperature.

The heating time is also not particularly limited as long as the liquid medium of the ink composition is evaporated and diffused and the pyrrolidone and/or polymer particles form a coating. The heating time can be appropriately set in view of the type of the liquid medium, the type of resin particles, and printing speed.

3. Examples

The invention will be further described in detail with reference to Examples. The invention is not however limited to the following Examples.

3.1. Preparation of Ink Compositions

3.1.1. Preparation of Pigment Dispersion 1

The ink compositions used in the Examples each contain a water-insoluble pigment as the coloring material. For adding the pigment to the ink composition, the pigment was dispersed with a resin dispersant in water and was thus used in the form of pigment dispersion. Pigment dispersion 1 was prepared as below. First, 65 parts of C.I. Pigment Black 7 was mixed with 35 parts of styrene-acrylic resin dispersion JONCRYL 611 (product of BASF), 1.70 parts of potassium hydroxide, and 250 parts of ultra-pure water purified from ion-exchanged water by reverse osmosis in a ball mill with zirconia beads, thus being dispersed for 10 hours. The resulting aqueous dispersion was filtered through a membrane filter with a pore size of 5 μm to yield black pigment dispersion 1 with a solid content of 20% (solid pigment content: 15%). Black pigment dispersion 1 was filtered through a glass fiber filter GA-100 (product of Advantec Toyo) to remove coarse particles, and the filtrate was adjusted to a pigment content of 15% by mass. The average particle size of pigment dispersion 1 was measured with a particle size distribution meter using dynamic light scattering, Microtrac UPA manufactured by Nikkiso, and the result was 110 nm.

3.1.2. Preparation of Pigment Dispersion 2

Black pigment dispersion 2 was prepared in the same manner as in the above-described "3.1.1. Preparation of Pigment Dispersion 1", except that dispersion in a ball mill with zirconia beads was performed for 15 hours. The solid content in pigment dispersion 2 was 20% (solid pigment content: 15%), and the average particle size of the pigment was 90 nm. The average particle size was measured with Microtrac UPA (the same applies to the following cases).

3.1.3. Preparation of Pigment Dispersion 3

Black pigment dispersion 3 was prepared in the same manner as in the above-described "3.1.1. Preparation of Pigment Dispersion 1", except that dispersion in a ball mill with zirconia beads was performed for 7 hours. The solid content in pigment dispersion 3 was 20% (solid pigment content: 15%), and the average particle size of the pigment was 130 nm.

3.1.4. Preparation of Pigment Dispersion 4

Black pigment dispersion 4 was prepared in the same manner as in the above-described "3.1.1. Preparation of Pigment Dispersion 1", except that dispersion in a ball mill with zirconia beads was performed for 4 hours. The solid content in pigment dispersion 4 was 20% (solid pigment content: 15%), and the average particle size of the pigment was 150 nm.

3.1.5. Preparation of Ink Composition

Using pigment dispersions 1 to 4 prepared above, different ink compositions were prepared according to Tables 2 and 3. For preparing each ink composition, the materials shown in Table 2 or Table 3 were placed in a container and were mixed together with a magnetic stirrer for 2 hours. The mixture was filtered through a membrane filter with a pore size of 10 μm to remove impurities and coarse particles. The values in Tables 2 and 3 are shown on a percent-by-mass basis, and ion exchanged water was added so that the total of the ink composition came to 100% by mass.

TABLE 2

| Type | Material | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Coloring material | Carbon black pigment dispersion 1 Solid content: 20% (pigment: 15%, resin dispersant: 5%) Particle size: 110 nm | 50 (7.5%) | 50 (7.5%) | 50 (7.5%) | 50 (7.5%) | 50 (7.5%) | 50 (7.5%) | 50 (7.5%) | 50 (7.5%) | 50 (7.5%) | 50 (7.5%) | | | | |
| | Carbon black pigment dispersion 2 Solid content: 20% (pigment: 15%, resin dispersant: 5%) Particle size: 90 nm | | | | | | | | | | | 40 (6.0%) | | | |
| | Carbon black pigment dispersion 3 Solid content: 20% (pigment: 15%, resin dispersant: 5%) Particle size: 130 nm | | | | | | | | | | | | 40 (6.0%) | | |
| | Carbon black pigment dispersion 4 Solid content: 20% (pigment: 15%, resin dispersant: 5%) Particle size: 160 nm | | | | | | | | | | | | | 40 (6.0%) | 40 (6.0%) |
| Alkyl polyol | 1,2-Pentanediol (boiling point: 210° C.) | 16 | 12 | 6 | 10 | 5 | 8 | 20 | 21 | 20 | 4.5 | 8 | 8 | 8 | 8 |
| | 1,2-Butanediol (boiling point: 194° C.) | | | 6 | 2 | 8 | 4 | 1 | 1 | | | 2 | 2 | 2 | 2 |
| | 1,3-Butanediol (boiling point: 208° C.) | — | 4 | — | — | — | — | — | — | — | — | — | — | — | — |
| | Propylene glycol (boiling point: 188° C.) | — | — | — | — | — | — | — | — | — | — | — | — | — | — |
| | 1,2-Hexanediol (boiling point: 224° C.) | — | — | 4 | 4 | 4 | 4 | — | — | 5 | 4.5 | 4 | 4 | 4 | 4 |
| Glycol ether | Ethylene glycol mono-2-ethylhexyl ether (HLB: 5.4, boiling pint: 229° C.) | 0.5 | | | | 0.5 | 0.5 | | | | | | | | |
| | Diethylene glycol mono-2-ethylhexyl ether (HLB: 5.8, boiling point: 272° C.) | | 0.5 | | | | | 0.5 | | | | | | | |
| | Diethylene glycol monohexyl ether (HLB: 6.5, boiling point: 259° C.) | | | 0.5 | | | | | 0.5 | | 0.5 | | | | |
| | Triethylene glycol monohexyl ether (HLB: 7.0, boiling point: 321° C.) | | | | 0.5 | | | | | 0.5 | | 0.5 | 0.5 | 0.5 | 0.5 |
| Resin particles | JONCRYL 537 (Ethylene-acrylic emulsion, solid content: 46%, Tg: 44° C., particle size: 70 nm) | 2.0 (0.98%) | | | | 2.0 (0.98%) | 2.0 (0.98%) | | | | | | | | |
| | JONCRYL 538 (Styrene-acrylic emulsion, solid content: 46.5%, Tg: 64° C., particle size: 100 nm) | | 2.0 (0.9%) | | | | | 2.0 (0.9%) | | | | 2.0 (0.9%) | 2.0 (0.9%) | 2.0 (0.9%) | 2.0 (0.98%) |
| | TAKELAC WS-6021 (Urethane emulsion, solid content: 30%, Tg: 65° C., particle size: 70 nm) | | | 2.5 (1.0%) | | | | | 2.5 (1.0%) | | | | | | |
| | TAKELAC W-635 (Urethane emulsion, solid content: 35%, Tg: 70° C., particle size: 150 nm) | | | | 1.66 (0.5%) | | | | | 1.66 (0.5%) | | | | | |
| | AQUACER 507 (Polyethylene wax particles, solid content: 35%, MFT: 130° C., particle size: 40 nm) | 2.0 (0.7%) | 2.0 (0.7%) | 2.86 (1.0%) | | 2.0 (0.7%) | 2.0 (0.7%) | 2.0 (0.7%) | 2.86 (1.0%) | | | 2.0 (0.7%) | 2.0 (0.7%) | 2.0 (0.7%) | 2.0 (0.7%) |
| | AQUACER 515 (Polyethylene wax particles, solid content: 35%, MFT: 130° C., particle size: 40 nm) | | | | 4.16 (1.25%) | | | | | 4.16 (1.25%) | 2.0 (0.7%) | | | | |
| Surfactant | BYK-347 (Silicone surfactant) | 0.2 | 0.2 | 0.2 | 0.2 | 0.2 | 0.2 | 0.2 | 0.2 | 0.2 | 0.2 | 0.2 | 0.2 | 0.2 | 0.2 |
| | BYK-348 (Silicone surfactant) | | | | | | | | | | | | | | |
| | Surfynol 104 PG 50 (Acetylene glycol-based surfactant) | 0.2 | 0.2 | 0.2 | 0.2 | 0.2 | 0.2 | 0.2 | 0.2 | 0.2 | 0.2 | 0.2 | 0.2 | 0.2 | 0.2 |
| | Surfynol DF 110D (Acetylene glycol-based surfactant) | | | | | | | | | | | | | | |
| pH adjuster | Tripropanolamine | 0.1 | 0.1 | 0.1 | 0.1 | 0.1 | 0.1 | 0.1 | 0.1 | 0.1 | 0.1 | 0.1 | 0.1 | 0.1 | 0.1 |
| Chelating agent | Ethylenediaminetetraacetic acid | 0.05 | 0.05 | 0.05 | 0.05 | 0.05 | 0.05 | 0.05 | 0.05 | 0.05 | 0.05 | 0.05 | 0.05 | 0.05 | 0.05 |
| Solvent | Ion exchanged water | Balance | Balance | Balance | Balance | Balance | Balance | Balance | Balance | Balance | Balance | Balance | Balance | Balance | Balance |

TABLE 3

| Type | Material | Comparative Example 1 | 2 | 3 | 4 | 5 |
|---|---|---|---|---|---|---|
| Coloring material | Carbon black pigment dispersion 1 (pigment: 15%, resin dispersant: 5%, particle size: 110 nm) 20% in ink | 40 (6.0%) | 40 (6.0%) | 40 (6.0%) | 40 (6.0%) | 40 (6.0%) |
| | Carbon black pigment dispersion 2 (pigment: 15%, resin dispersant: 5%, particle size: 90 nm) 20% in ink | | | | | |
| | Carbon black pigment dispersion 3 (pigment: 15%, resin dispersant: 5%, particle size: 130 nm) 20% in ink | | | | | |
| | Carbon black pigment dispersion 4 (pigment: 15%, resin dispersant: 5%, particle size: 160 nm) 20% in ink | | | | | |
| Alkyl polyol | 1,2-Pentanediol (boiling point: 210° C.) | 4 | 20 | — | — | |
| | 1,2-Butanediol (boiling point: 194° C.) | | | | | |
| | 1,3-Butanediol (boiling point: 208° C.) | | | — | | 6 |
| | Propylene glycol (boiling point: 188° C.) | — | — | — | 6 | — |
| | 1,2-Hexanediol (boiling point: 224° C.) | 3 | 6 | 3 | 4 | — |
| Glycol ether | Ethylene glycol mono-2-ethylhexyl ether (HLB: 5.4, boiling pint: 229° C.) | | | | | |
| | Diethylene glycol mono-2-ethylhexyl ether (HLB: 5.8, boiling point: 272° C.) | | | | | |
| | Diethylene glycol monohexyl ether (HLB: 6.5, boiling point: 259° C.) | | | | | 0.5 |
| | Triethylene glycol monohexyl ether (HLB: 7.0, boiling point: 321° C.) | | | | | |
| Resin particles | JONCRYL 537 (Ethylene-acrylic emulsion, solid content: 46%, Tg: 44° C., particle size: 70 nm) | 2.0 (0.98%) | 2.0 (0.98%) | 2.0 (0.98%) | 2.0 (0.98%) | |
| | JONCRYL 538 (Styrene-acrylic emulsion, solid content: 46.5%, Tg: 64° C., particle size: 100 nm) | | | | | |
| | TAKELAC WS-6021 (Urethane emulsion, solid content: 30%, Tg: 65° C., particle size: 70 nm) | | | | | 2.5 (1.0%) |
| | TAKELAC W-635 (Urethane emulsion, solid content: 35%, Tg: 70° C., particle size: 150 nm) | | | | | — |
| | AQUACER 507 (Polyethylene wax particles, solid content: 35%, MFT: 130° C., particle size: 40 nm) | 2.0 (0.7%) | 2.0 (0.7%) | 2.0 (0.7%) | 2.0 (0.7%) | 2.86 (1.0%) |
| | AQUACER 515 (Polyethylene wax particles, solid content: 35%, MFT: 130° C., particle size: 40 nm) | — | — | — | — | |
| Surfactant | BYK-347 (Silicone surfactant) | 0.2 | 0.2 | 0.2 | 0.2 | 0.2 |
| | BYK-348 (Silicone surfactant) | | | | | |
| | Surfynol 104 PG 50 (Acetylene glycol-based surfactant) | 0.2 | 0.2 | 0.2 | 0.2 | 0.2 |
| | Surfynol DF 110D (Acetylene glycol-based surfactant) | | | | | |
| pH adjuster | Tripropanolamine | 0.1 | 0.1 | 0.1 | 0.1 | 0.1 |
| Chelating agent | Ethylenediaminetetraacetic acid | 0.05 | 0.05 | 0.05 | 0.05 | 0.05 |
| Solvent | Ion exchanged water | Balance | Balance | Balance | Balance | Balance |

Materials indicated by the product names in Tables 2 and 3 are as follows:

BYK-348, 347 (produced by BYK, silicone surfactant)

Surfynol DF 110D (acetylene glycol-based antifoaming agent, produced by Nissin Chemical Industry)

Surfynol 104 PG 50 (acetylene glycol-based surfactant, produced by Nissin Chemical Industry)

AQUACER 515 (polyethylene wax emulsion (35% dispersion), produced by BYK)

TAKELAC WS6021, W635 (emulsion containing urethane resin particles, produced by Mitsui Chemicals)

AQUACER 507 (polyethylene wax emulsion, produced by BYK)

JONCRYL 537, 538 (emulsion containing acrylic resin particles, produced by BASF)

3.2. Evaluations of Ink Compositions 3.2.1. Clogging of Head

The ink compositions shown in Tables 2 and 3 were each placed in the head of an ink jet printer PX-G930 manufactured by Seiko Epson (nozzle, Inc. make, nozzle resolution: 180 dpi). After a nozzle check pattern was printed and checked to ensure that filling failure or nozzle clogging did not occur, the printer was turned off and allowed to stand with the head in a home position (in a state where the head was provided with a cap) in an environment of a temperature of 40° C. and a humidity of 10% to 20% RH for two weeks. Then, the printer was cleaned if necessary, and the conditions of the nozzles through which the ink composition was ejected were observed while a nozzle check pattern was printed. Thus the clogging of the ink jet head with the ink composition was evaluated.

The evaluation criteria were as follows and the evaluation results are shown in Table 4:

A: After cleaning operation was performed 3 times or less, the ink composition was properly ejected through all the nozzles.

B: After cleaning operation was performed 4 to 6 times, the ink composition was properly ejected through all the nozzles.

C: After cleaning operation was performed 7 to 10 times, the ink composition was properly ejected through all the nozzles.

D: Cleaning operation was performed 11 times or more until the ink composition was properly ejected through all the nozzles.

E: Some nozzles did not properly eject the ink composition even after cleaning more than 11 times.

TABLE 4

|  | Example | | | | | | | | | | | | | | Comparative Example | | | |
|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 1 | 2 | 3 | 4 |
| Clogging | A | A | B | A | C | B | A | A | A | C | A | A | A | A | B | A | E | E |

3.2.2. Storage Stability

Each ink composition shown in Tables 2 and 3 was enclosed in a bottle and allowed to stand in an environment of 60° C. for one week. Then, the ink composition was observed for the viscosity change and the states of separation, settling and aggregation for evaluating the storage stability of the ink composition.

The evaluation criteria were as follows and the evaluation results are shown in Table 5.

Viscosity Change

A: Variation from the viscosity immediately after preparation was in the range of more than −5% to less than +5%.

B: Variation from the viscosity immediately after preparation was in the range of more than −10% to −5% or less or in the range of +5% or more to less than +10%.

C: Variation from the viscosity immediately after preparation was in the range of more than −20% to −10% or less or in the range of +10% or more to less than +20%.

D: Variation from the viscosity immediately after preparation was −20% or less or +20% or more.

Separation, Settling, Aggregation

A: Separation, settling or aggregation was not observed.

B: A small amount of separation, settling or aggregation was observed.

C: Separation, settling or aggregation was clearly observed.

D: A significant amount of separation, settling or aggregation was observed.

3.2.3. Print Density of Recorded Article

Ink-absorbent high-quality paper 55PW8R (manufacture by Lintec Corporation) was used as a recording medium. An ink jet printer PX-G930 (manufactured by Seiko Epson, nozzle resolution: 180 dpi) was used as the ink jet recording printer. PX-G930 has a temperature-variable heater within the paper guide.

Each ink composition was separately placed in the ink jet printer, and printing was performed on the recording medium. A solid pattern was formed at resolutions of 720 dpi in the lateral direction and 720 dpi in the vertical direction at a duty of 100%. The heater of the printer was set to a condition where "the printing surface would be heated to 40° C." In addition, the recorded article was dried by being blown with hot air of 80° C. during and immediately after recording. The blowing air was applied at such an intensity that the wind speed was about 2 to 5 m/s at the surface of the recording medium. The Blowing time immediately after recording was 1 minute. The print density (optical density, OD value) of the recorded article prepared as above was measured with a portable reflection density meter RD-19T (manufactured by SAKATA INX ENG.) The results are shown in Table 6. The evaluation criteria of the print density of recorded articles were as follows:

A: OD value was 1.4 or more.

B: OD value was 1.3 or more and less than 1.4.

C: OD value was 1.2 or more and less than 1.3.

D: OD value was less than 1.2.

TABLE 5

|  | Example | | | | | | | | | | | | | | Comparative Example | | | |
|---|---|---|---|---|---|---|---|---|---|---|---|---|---|---|---|---|---|---|
| Ejection stability | 1 | 2 | 3 | 4 | 5 | 6 | 7 | 8 | 9 | 10 | 11 | 12 | 13 | 14 | 1 | 2 | 3 | 4 |
| Viscosity change | A | A | A | A | A | A | B | C | C | A | A | A | A | A | D | A | A |  |
| Separation/settling/aggregation | A | A | A | A | A | A | C | C | C | B | A | A | B | C | A | C | A | A |

TABLE 6

|  | Example | | | | | | | | | | | | | | Comparative Example | | | |
|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 1 | 2 | 3 | 4 |
| Print density (Recoding medium: 55PW8R) | A | A | A | A | A | A | A | A | A | A | A | B | A | A | C | A | B | B |

3.2.4. Rub Fastness of Recorded Article

Recording media used were ink-absorbent high-quality paper "55PW8R" (manufactured by Lintec Corporation), ink-low-absorbent book printing paper "POD Gloss Coat" (manufactured by Oji Paper), and ink-non-absorbent polypropylene film "SY51M 2.6 mil. PP White TC RP37 2.2 mil. HIGH DENSITY WHITE" (hereinafter referred to as SY51M, manufactured by UPM RAFLATA). An ink jet printer PX-G930 (manufactured by Seiko Epson, nozzle resolution: 180 dpi) was used as the ink jet recording printer. PX-G930 has a temperature-variable heater within the paper guide.

Each ink composition was separately placed in the ink jet printer, and printing was performed on the recording media. A solid pattern was formed at resolutions of 720 dpi in the lateral direction and 720 dpi in the vertical direction at a duty of 100%. The heater of the printer was set to a condition where "the printing surface would be heated to 40° C." In addition, the recorded article was dried by being blown with hot air of 80° C. during and immediately after recording. The blowing air was applied at such an intensity that the wind speed was about 2 to 5 m/s at the surface of the recording medium. The Blowing time immediately after recording was 1 minute.

The resulting printed article was allowed to stand in a laboratory at room temperature (25° C.) for 5 hours, and the recorded surface of the recorded article was rubbed ten times at a load of 200 g with cotton cloth, using a Gakushin-type rubbing tester AB-301 (manufactured by Tester Sangyo). Then, the rub fastness of the sample was evaluated by checking for separation from the recorded surface and the transfer of the ink to the cotton cloth.

The evaluation criteria were as follows and the evaluation results are shown in Table 7:

A: Separation or ink transfer to the cotton cloth was not observed even by rubbing 10 times.

B: A small amount of separation or ink transfer to the cotton cloth was observed by rubbing 10 times.

C: Separation or ink transfer to the cotton cloth was observed by rubbing 10 times.

D: Separation or ink transfer to the cotton cloth was observed before the number of times of rubbing reached 10.

TABLE 7

| Rub fastness | Example | | | | | | | | | | | | | | Comparative Example | | | |
|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 1 | 2 | 3 | 4 |
| Recoding medium: 55PW8R | A | A | A | A | A | A | A | A | A | A | A | A | B | C | D | A | A | A |
| Recording medium: POD Gloss Coat | A | A | A | A | A | A | A | A | B | A | A | A | A | B | C | C | A | A |
| Recoding medium: SY51M | A | A | A | A | A | A | A | B | C | A | A | A | B | C | D | D | A | A |

3.2.5. Non-Uniform Density of Recorded Article

Recording media used were ink-low-absorbent book printing paper "POD Gloss Coat" (manufactured by Oji Paper) and ink-non-absorbent polypropylene film "SY51M" (manufactured by UPM RAFLATA). An ink jet printer PX-G930 (manufactured by Seiko Epson, nozzle resolution: 180 dpi) was used as the ink jet recording printer. PX-G930 has a temperature-variable heater within the paper guide. A solid pattern was formed at a resolution of 720 dpi in the lateral direction and 720 dpi in the vertical direction at duties in increments of 10% in the range of 50% to 100%. Other printing conditions were the same as in "3.2.3. Print Density of Recorded Article".

The ink density of the recorded article was visually checked for non-uniformity (color development, glossiness). The evaluation criteria were as follows and the evaluation results are shown in Table 8. Note that the invention is not necessarily required to solve the disadvantage of non-uniform density.

A: Non-uniform density was not observed in the recorded article formed at duties of 80% or more.

B: Non-uniform density was not observed in the recorded article formed at duties of 70% or less.

C: Non-uniform density was not observed in the recorded article formed at duties of 60% or less.

D: Non-uniform density was observed in the recorded article formed at duties of 60% or less.

TABLE 8

| Non-uniform density (Sub subject) | Example | | | | | | | | | | | | | | Comparative Example | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 | 3 | 4 |
| Recording medium: POD Gloss Coat | B | A | B | A | B | A | A | A | A | B | A | A | A | C | C | A | C | B |
| Recoding medium: SY51M | C | A | B | A | C | B | B | B | A | C | A | A | B | D | D | A | D | C |

The invention is not limited to the above-described embodiments, and various modifications may be made. For example, the invention includes substantially the same form as the disclosed embodiments (for example, a form including the same function and method and producing the same result, or a form having the same purpose and producing the same effect). Some elements unessential to the form of the disclosed embodiment may be replaced. The form of an embodiment of the invention includes an element producing the same effect or achieving the same object, as the form of the disclosed embodiments. The forms of the disclosed embodiments may be combined with the known art.

What is claimed is:

1. An ink composition comprising:
   a coloring material;
   1,2-pentanediol with a content in the range of more than 0% to less than 20% by mass;
   1,2-hexanediol; and
   an alkyl polyol having a normal boiling point in the range of 190 C to 250 C, wherein the alkyl polyol is selected from the group consisting of ethylene glycol, 1,2-ethanediol, 1,2-propanediol, 2-methylpentane-2,4-diol, dibutylene glycol, 1,3-butylene glycol, 1,3-butanediol, 1,3-propanediol, 3-methyl-1,3-butanediol, 2-methyl-1,3-propanediol, 2,2-dimethyl-1,3-propanediol, 2-ethyl-2-methyl-1,3-propanediol, 1,4-butanediol, 2-methyl-2-propyl-1,3-propanediol, dipropylene glycol, 2-ethyl-1,3-hexanediol, 3-methyl-1,5-pentanediol, and 1,6-hexanediol.

2. The ink composition according to claim 1, further containing at least one of a glycol ether having an HLB value, measured by the Davies method, of 3.0 to 7.8, an antifoaming agent and a hardly soluble alkanediol, wherein the ratio of the total mass of the 1,2-pentanediol and the 1,2-hexanediol to the total mass of the glycol ether, the antifoaming agent and the hardly soluble alkanediol is in the range of 3:1 to 15:1.

3. The ink composition according to claim 1, containing substantially no alkyl polyol having a normal boiling point of 280° C. or more.

4. The ink composition according to claim 1, further containing a glycol ether having an HLB value, measured by the Davies method, of 3.0 to 7.8.

5. The ink composition according to claim 1, further containing an antifoaming agent.

6. The ink composition according to claim 1, wherein the total content of alkyl polyols having a normal boiling point in the range of 190 to 250° C. is in the range of 10% to 30% by mass in the ink composition.

7. The ink composition according to claim 1, wherein the coloring material is a pigment dispersed with a resin dispersant, having an average particle size in the range of 80 to 140 nm.

8. A recording apparatus that performs recording with the ink composition as set forth in claim 1.

9. A recording apparatus that performs recording with the ink composition as set forth in claim 2.

10. A recording apparatus that performs recording with the ink composition as set forth in claim 3.

11. A recording apparatus that performs recording with the ink composition as set forth in claim 4.

12. A recording apparatus that performs recording with the ink composition as set forth in claim 5.

13. A recording apparatus that performs recording with the ink composition as set forth in claim 6.

14. A recording apparatus that performs recording with the ink composition as set forth in claim 7.

15. A recorded article comprising a record formed with the ink composition as set forth in claim 1.

16. A recorded article comprising a record formed with the ink composition as set forth in claim 2.

17. A recorded article comprising a record formed with the ink composition as set forth in claim 3.

18. The ink composition according to claim 1, wherein the alkyl polyol is selected from the group consisting of 1,3-butanediol, 3-methyl-1,5-pentanediol, and 3-methyl-1,3-butanediol.

* * * * *